United States Patent [19]
Weaver

[11] Patent Number: 5,409,613
[45] Date of Patent: Apr. 25, 1995

[54] RECYCLING AND RECOVERY OF AQUEOUS CLEANER SOLUTIONS AND TREATMENT OF ASSOCIATED RINSE WATER

[76] Inventor: Thomas J. M. Weaver, 56 Alexander Rd., Billerica, Mass. 01821

[21] Appl. No.: 9,239

[22] Filed: Jan. 26, 1993

Related U.S. Application Data

[62] Division of Ser. No. 773,140, Oct. 8, 1991, Pat. No. 5,207,917.

[51] Int. Cl.$^6$ .................................. B01D 61/00
[52] U.S. Cl. ................... 210/651; 210/661; 210/650; 210/652; 210/195.2; 210/257.2; 134/10; 134/110
[58] Field of Search .............. 210/650, 651, 652, 654, 210/727, 195.2, 257.2, 661; 134/10, 13, 110, 60, 108

[56] References Cited

U.S. PATENT DOCUMENTS

| | | |
|---|---|---|
| 2,822,091 | 2/1958 | Martine, Jr. |
| 3,541,004 | 11/1970 | Cooper, IV et al. |
| 3,568,834 | 3/1971 | Treat |
| 3,722,694 | 3/1973 | Agranat |
| 4,141,823 | 2/1979 | Smith et al. |
| 4,165,288 | 8/1979 | Teed et al. |
| 4,203,848 | 5/1980 | Grandine, II ............... 210/490 |
| 4,244,505 | 1/1981 | Stokes, Jr. et al. ........... 210/652 |
| 4,313,830 | 2/1982 | Tulin et al. .................. 210/651 |
| 4,332,686 | 6/1982 | Gerlach et al. .............. 210/651 |
| 4,384,888 | 5/1983 | Yu ................................ 75/68 R |
| 4,388,192 | 6/1983 | Hellqvist ..................... 210/615 |
| 4,414,115 | 11/1983 | The .............................. 210/665 |
| 4,435,289 | 3/1984 | Breslau ........................ 210/637 |
| 4,436,643 | 3/1984 | Burger et al. ............... 210/727 |
| 4,454,044 | 6/1984 | Klein ............................ 210/663 |
| 4,505,823 | 3/1985 | Klein ............................ 210/668 |
| 4,548,716 | 10/1985 | Boeve ........................... 210/652 |
| 4,569,756 | 2/1986 | Klein ............................ 210/193 |
| 4,595,509 | 6/1986 | Fox et al. .................... 210/665 |
| 4,610,792 | 9/1986 | Van Gils et al. ............ 210/639 |
| 4,655,927 | 4/1987 | Ford .............................. 210/639 |
| 4,655,928 | 4/1987 | Milton et al. ................ 210/652 |
| 4,664,812 | 5/1987 | Klein ............................ 210/679 |
| 4,678,477 | 7/1987 | The et al. ..................... 210/652 |
| 4,727,705 | 3/1988 | Zahka ........................... 53/425 |
| 4,769,158 | 9/1988 | Eckert .......................... 210/780 |
| 4,861,385 | 8/1989 | Yagishita ...................... 134/10 |

(List continued on next page.)

OTHER PUBLICATIONS

B. Mavrov et al., "Emulsified Oily Degreasing Baths Regeneration By Ultrafiltration", Proceedings, vol. 1, The 1990 International Congress on Membranes and Membrane Processes, 1990, pp. 35–37.

S. P. Evanoff et al., "Alternatives To Chlorinated Solvent Degreasing—Testing, Evaluation, and Process Design", Process Technology, Aug., 1988.

Product literature, Prosys Corp., 187 Billerica Road, Chelmsford, Mass. 01824–9977, Dec. 1990.

Philip A. Schweitzer, Handbook of Separation Techniques for Chemical Engineers, pp. 2–5. McGraw Hill Book Co.

*Primary Examiner*—Robert A. Dawson
*Assistant Examiner*—Ana M. Fortuna
*Attorney, Agent, or Firm*—Weingarten, Schurgin, Gagnebin & Hayes

[57] ABSTRACT

A process and apparatus are disclosed for separating an aqueous cleaner solution from contaminants that accumulate as the cleaner is used in washing manufactured objects, such as machine parts or printed circuit boards. In the separation process, filtration of contaminated aqueous cleaner solutions using a membrane of an appropriately chosen pore size removes oils, greases, fluxes, rosins and other emulsified or dispersed contaminants from the cleaners while permitting the molecules of the cleaner itself to stay in solution. The filtered cleaner solution is then recycled to the wash tank. Also disclosed are a process and apparatus for treating the rinse water used to rinse objects that are cleaned with the recycled cleaner.

31 Claims, 3 Drawing Sheets

U.S. PATENT DOCUMENTS

| | | | |
|---|---|---|---|
| 4,880,511 | 11/1989 | Sugita | 210/652 |
| 4,885,095 | 12/1989 | Rich | 210/652 |
| 4,898,667 | 2/1990 | Diman et al. | 210/138 |
| 4,929,354 | 5/1990 | Meyering et al. | 210/321.61 |
| 4,940,542 | 7/1990 | Simizu et al. | 210/321.8 |
| 4,959,149 | 9/1990 | Raneri | 210/636 |
| 4,976,876 | 12/1990 | Diman et al. | 210/791 |
| 4,980,066 | 12/1990 | Slegers | 210/636 |
| 4,986,918 | 1/1991 | Breslau et al. | 210/652 |
| 4,988,445 | 1/1991 | Fulk, Jr. | 210/652 |
| 4,992,177 | 2/1991 | Fulk, Jr. | 210/644 |
| 4,992,332 | 2/1991 | Kamei et al. | 428/398 |
| 5,017,291 | 5/1991 | Semler et al. | 210/650 |
| 5,024,770 | 6/1991 | Boyd et al. | 210/747 |
| 5,028,335 | 7/1991 | Sleytr et al. | 210/638 |
| 5,043,072 | 8/1991 | Hitotsuyanagi et al. | 210/650 |
| 5,061,374 | 10/1991 | Lewis | 210/654 |
| 5,174,315 | 12/1992 | Hellstern et al. | 134/60 |
| 5,183,572 | 2/1993 | Benn | 210/651 |
| 5,186,758 | 2/1993 | Hartman | 134/10 |

RECYCLING AND RECOVERY OF AQUEOUS CLEANER SOLUTIONS AND TREATMENT OF ASSOCIATED RINSE WATER

RELATED APPLICATION

This application is a division of U.S. patent application Ser. No. 07/773,140, filed on Oct. 8, 1991, now U.S. Pat. No. 5,207,917.

FIELD OF THE INVENTION

This invention relates to treating wastewater and more particularly to cleaning solutions of an aqueous cleaner and associated rinse water.

BACKGROUND OF THE INVENTION

Aqueous cleaners, including alkaline cleaners or concentrated soap solutions which typically operate at 10% strength, are known to be effective in removing oil, grease, soils and other contaminants from manufactured or processed parts, e.g., a machine component or a printed circuit board. Such cleaners are being used with increasing frequency as replacements for the ozone depleting chlorofluorocarbons (CFCs). However, the dispersants, wetting agents, and additives that are a normal part of an aqueous cleaner solution can cause severe upsets in conventional waste treatment operations, and methods of handling such cleaners without creating a wastewater treatment problem are needed.

In a typical wash process a rack mounted component is rinsed with aqueous cleaner solution, washed with fresh cleaner, and then rinsed with water in a cascade series of rinse tanks. In this process a certain amount of cleaner and associated contaminants, called the "dragout," are carried over into the rinse tanks to contaminate the rinse water. Alternatively, smaller components can be washed in tumbling barrels, then allowed to drain in a dragout process produces a large amount of dragout and is typically the cause of high cleaner consumption.

Some of the waste products that can accumulate in aqueous cleaner solutions are metals and other particulate materials (including lead, flux and rosin) as well as greases and oils. As a way of handling such wastes, wetting agents and other surfactants are included in aqueous cleaner solutions to emulsify the oils, while dispersants are added to retain particulate matter in solution. In time, however, the effectiveness of the added surfactants and dispersants is exceeded; particulate matter precipitates out of solution, contaminating the crevices of a component being cleaned; and a floating oil film appears on the surface of the bath to coat articles removed from the wash tank. When conditions in the wash bath reach this level, the cleaner is spent and must be discarded although titration of the actual cleaner strength shows that the cleaner still has functional capacity.

SUMMARY OF THE INVENTION

It has been discovered that microfiltration of contaminated aqueous cleaner solutions, using membranes of appropriately chosen pore size, will remove oils, greases, fluxes, rosins and other emulsified or dispersed contaminants from the cleaners while permitting the molecules of the cleaner itself to stay in solution. In a process to treat contaminated cleaner solutions, microfiltration is used as the first process step, the filtered cleaner is returned to the original wash tank, and the contaminated solution retained by the membrane is passed back to a holding or concentration tank. Additional cycles through the filter system result in gradual removal of additional filtered cleaner and concentration of the contaminants in the concentration tank. With the concentration of the contaminants, the emulsion of the oil and surfactants, becoming saturated above its ability to maintain a suspension, breaks down or "cracks." The oil then collects as a film on the surface of the cleaner, making simple mechanical removal possible. In addition, as the solids concentrate, the dispersants are no longer capable of maintaining the particles in solution. The particulate contaminants then tend to settle and can be removed.

If a cleaning solution being used to clean a number of components is treated in this manner, the dragout is primarily aqueous cleaner and water. The rinse water used to rinse such a cleaned component can then be separated from the molecules of the aqueous cleaner with an additional, properly sized, membrane system, usually ultrafiltration or reverse osmosis, without fouling the membrane. The concentrated cleaner collected as a result of such a procedure, with selective replacement of the various organic components as necessary, can be directed back to the wash tank to make up for evaporation losses and cleaner dragout. The cleaned rinse water is then suitable for discharge or direct recycle to the rinse tank, or for follow-on treatment specifically configured to the needs of the process system.

When the aqueous cleaner includes low molecular weight organics, removal of all components of the cleaner in a single step is difficult. Thus, for either recycling or direct discharge to the sewer, the rinse water might first need to be freed from the materials creating a biological oxygen demand (BOD) or a chemical oxygen demand (COD). For example, the temperature of the rinse water can be lowered and ozone added to destroy COD and BOD components. Alternatively, activated carbon may be used to remove COD and BOD by adsorptive filtration. In addition, rinse water may be treated in a vacuum flash distillation system to evaporate off the water while retaining and concentrating volatile organics having a higher boiling temperature than water. If the rinse water has accumulated a high concentration of salts, treatment with ion exchange chromatography may be necessary.

In general, the invention features a process and apparatus for separating an aqueous cleaner solution from contaminants by transferring the contaminated cleaner to a concentration tank, cycling the contaminated cleaner solution across a microfiltration membrane having an average pore diameter chosen to filter out contaminants while not filtering out molecules of aqueous cleaner, returning unfiltered cleaner solution to the concentration tank, and collecting filtered cleaner solution.

In preferred embodiments, the membrane has an average pore diameter of 0.1–0.4 $\mu$m, preferably 0.2 $\mu$m; the contaminated cleaner solution is cycled repeatedly across the membrane; the membrane is subjected periodically to a backwash pulse; precipitated solids are removed from the bottom of the concentration tank; and floating oil is removed from the top of the concentration tank.

In another aspect, the invention features cleaning rinse water used with an aqueous cleaner solution system, in which an object cleaned in a cleaner solution is transferred from the cleaner solution to a rinse tank, by first treating an aqueous cleaner solution to remove contaminants; using the treated aqueous cleaner solution in a wash tank to clean an object; rinsing the object with rinse water so that the rinse water becomes contaminated with the treated aqueous cleaner solution; and treating the contaminated rinse water to remove molecules of the aqueous cleaner.

Preferred embodiments of the process for cleaning rinse water include the following features. The aqueous cleaner solution is treated according to the process of the invention, as described above. The final treatment step of the rinse water treatment process involves filtering the contaminated rinse water using a membrane having an average pore diameter chosen to filter out contaminants while not filtering out molecules of aqueous cleaner and collecting the filtered rinse water. Preferably, the membrane has an average pore diameter of less than 0.1 μm, most preferably, 0.001-0.1 μm. The aqueous cleaner filtered from the rinse water is collected and returned to the wash tank, and the filtered rinse water is returned to the rinse tank. Additionally, the rinse water treatment process can include treating the filtered rinse water with activated carbon, ozone, ion exchange resins, or in a vacuum distillation procedure and disposing of the treated rinse water or returning the water to the rinse tank.

As used herein, a cleaner is a compound that removes dirt, oil, grease, metal, flux, spent resin, and other contaminants from a machined product or work piece. An aqueous cleaner solution contains water, surface active agents, wetting agents, emulsifiers to retain grease and oil in solution, dispersants to retain solid particles in solution, and other desired additives. Typical aqueous cleaners are caustic soap solutions and organic formulations such as products made by Blue Gold Co., Ashland, Ohio, and Litton/Kester Solder, Des Plaines, Ill.

A microfiltration membrane is a membrane having a pore size from 0.1-10 μm and is used to separate suspended and colloidal particles from solution. Microfiltration membranes may be of ceramic, polymer, or other plastic materials and preferably have backpulse capability, i.e., a reverse flow of the filtrate at pressure through the membrane to the concentrate side will remove buildup of contaminants which tend to reduce the flow rate of the membrane. An ultrafiltration membrane, typically hollow fiber, spiral wound, or crossflow, has a pore size of 0.001-0.1 μm and is used to separate emulsions, proteins and macromolecules from solution. The materials of construction are typically the same as for microfiltration membranes. Ultrafiltration membranes are either backpulsed using the method described above, or backwashed by shutting the filtrate valve for a period of time. A reverse osmosis membrane, typically spiral wound or hollow fiber, has a pore size less than 0.001 μm and typically cannot be backpulsed or backwashed.

Aqueous cleaners recycled by the process of the invention have a greatly extended lifetime over untreated cleaners, thus resulting in substantial savings for the user. The cleaners may be processed on-line and at the temperature and pH of use so that no preliminary adjustments are necessary. The process requires no chemical additives. In addition, recycled aqueous cleaner solutions contribute fewer contaminants to the rinse water associated with a cleaning process than do non-recycled cleaner solutions, resulting in rinse water that can much more successfully be recycled or disposed of according to wastewater treatment guidelines. The contaminants, dispersants, and wetting agents normally carried over into the rinse water foul and destroy ion exchange resin and completely block reverse osmosis processes when such common procedures are tried for recycling or wastewater treatment. Elimination of such contaminants by the use of recycled cleaners greatly expands the variety of rinse water treatments possible. For commercial cleaning operations already near or at the aqueous discharge limit, in terms of flow rate and technology, before aqueous cleaner solutions are introduced to replace CFCs, recycling of the cleaner solutions will be essential to permit their use.

Other features and advantages of the invention will be apparent from the following description of the preferred embodiment thereof and from the claims.

DESCRIPTION OF THE DRAWINGS

The invention will be more completely understood from a consideration of the following detailed description taken in conjunction with the drawings, in which.

DESCRIPTION OF THE PREFERRED EMBODIMENT

Figure 1:
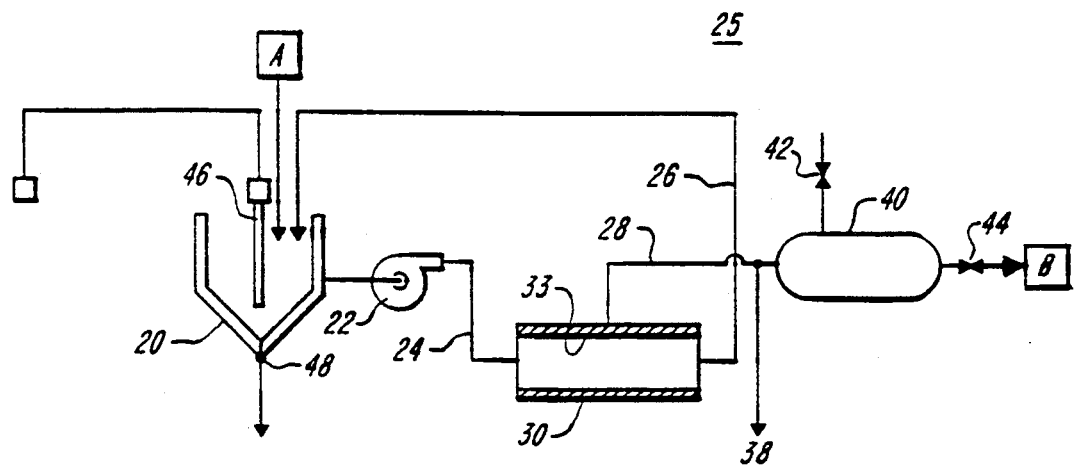
FIG. 1 shows a schematic diagram illustrating the steps of a process of the invention and the relationship of the elements of an apparatus of the invention.
Figure 2:
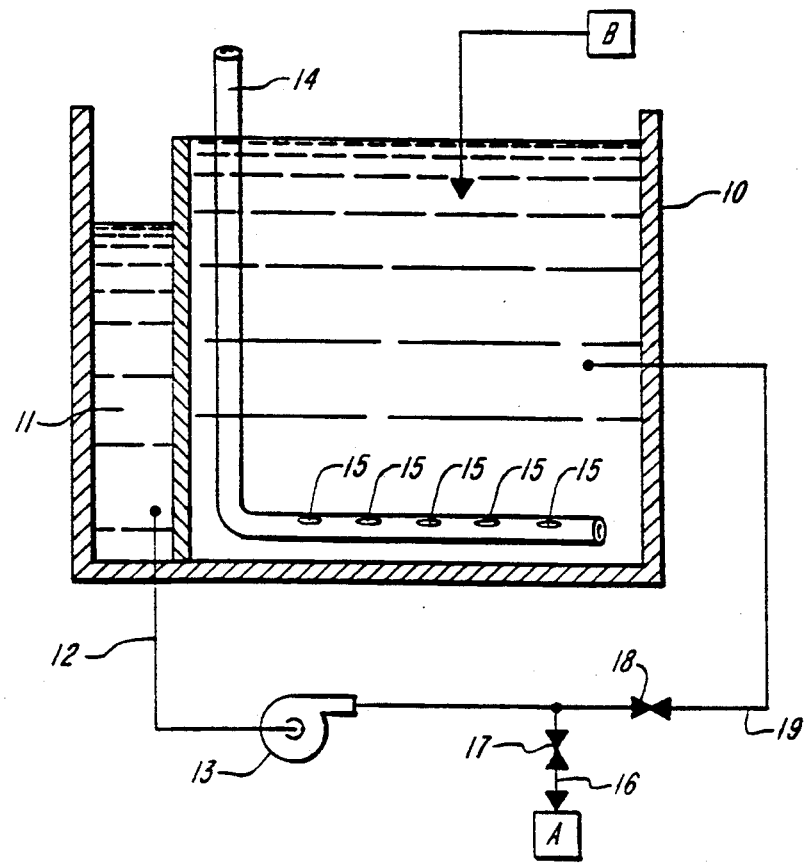
FIG. 2 shows a schematic diagram partially illustrating the process and the apparatus of the invention of FIG. 1.

Referring to FIG. 2, a standard cleaner or wash tank 10, ranging from 50 gal. to in excess of 10,000 gal., (e.g. 900 gal.), having attached overflow weir 11, is fitted with a recirculation and feed system 12, driven by recirculation pump 13, to maintain equilibrium in wash tank 10 by transferring cleaner solution from the overflow weir back to the wash tank. Wash tank 10 additionally contains an air fed recirculation and mixing loop 14 from which air emerges via outlets 15 to agitate the cleaner in the tank. Recirculation and feed system 12 is fitted with outlet line 16 and with mechanically or electrically driven solenoids 17 and 18, located in outlet line 16 and return portion 19 of recirculation and feed system 12, respectively. Transfer of the used cleaner solution from wash tank 10 to (e.g.) a 35 gal. capacity conical concentration tank 20 at point A (FIG. 1) may be carried out by a continuous or a batch transfer process at approximately 10 gal./min. The desired rate of transfer is dependent upon the rate of influx of contaminants into the wash tank, the size of the tank, and the cleaning capacity of the cleaner used.

Referring specifically to FIG. 1, microfiltration system 25 consists of conical concentration tank 20 fitted with a feed pump 22 and associated piping or feed line 24 to direct contaminated cleaner from the concentration tank into the microfiltration membrane system 30, described in more detail below. Concentrated contaminated cleaner solution emerging from membrane filtration system 30, via feed line 26, is returned to concentration tank 20. Filtered cleaner solution emerging via process line 28 is stored dynamically in flowthrough backpulse tank 40, having air pressurization line 41 controlled by solenoid 42, and finally recycled to wash tank 10 at point B through solenoid 44.

Figure 3:
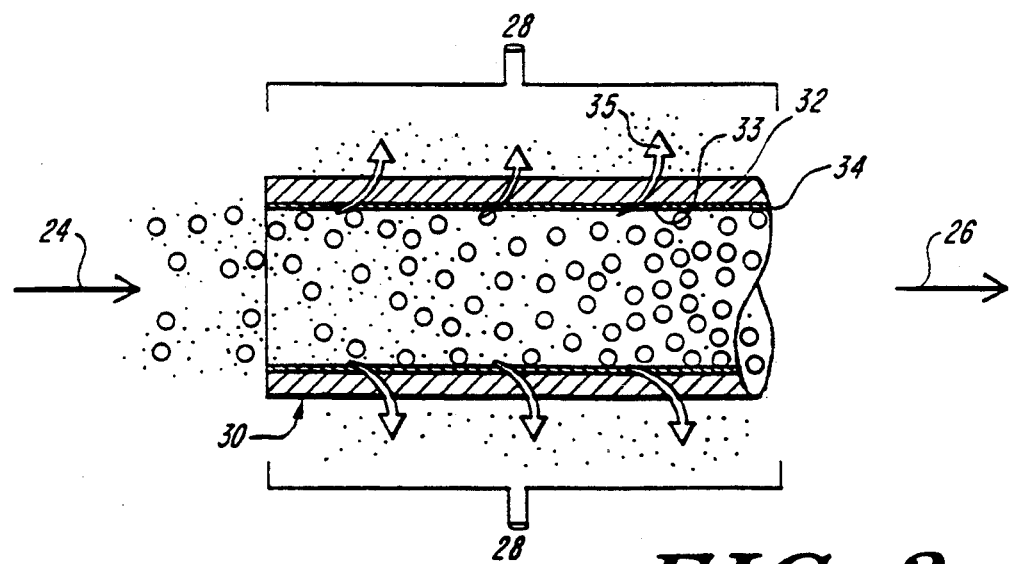
FIG. 3 shows a schematic diagram partially illustrating the process and the apparatus of the invention of FIG. 1.

Referring to FIG. 3, the membrane filtration process in microfiltration membrane system 30 is a cross-flow process, such as that provided by the symmetrical and self-supporting Accurel® membrane (Microdyn Modulbau GMBH & Co., Wuppertal, Germany), a polypropylene membrane with a nominal pore size of 0.2 μm and a porosity of 75%, for use at temperatures below 140° F. The cross-flow microfiltration process involves solid/liquid separation by a tubular membrane in the presence of a simultaneously superimposed cross-flow of the incoming liquid process stream. The solid particles separated from the filtered liquid by the membrane are continuously removed by cross-flow action of the unfiltered stream at the membrane surface. Thus, a portion of a dirty cleaner solution feeding into membrane system 30 via feed line 24 at, e.g., 50 gal./min., permeates the membrane surface 33, in the direction of arrows 35 and emerges as a cleaned solution, to be fed back to wash tank 10 at point B, via feed line 28. The remaining (majority) portion of the contaminated cleaner solution emerging from membrane system 30 via line 26 at, e.g., 47 gal./min., is concentrated as a result of the loss of the cleaned portion. This concentrated cleaner solution is returned to concentration tank 20 and the cycle is repeated. For temperatures greater than 140° F., the Ceraflo® membrane (Norton Co., Worcester, Mass.) or the Membralox® membrane, (Alcoa Separations Technology, Inc., Warrendale, Pa.) may be used.

Figure 4:
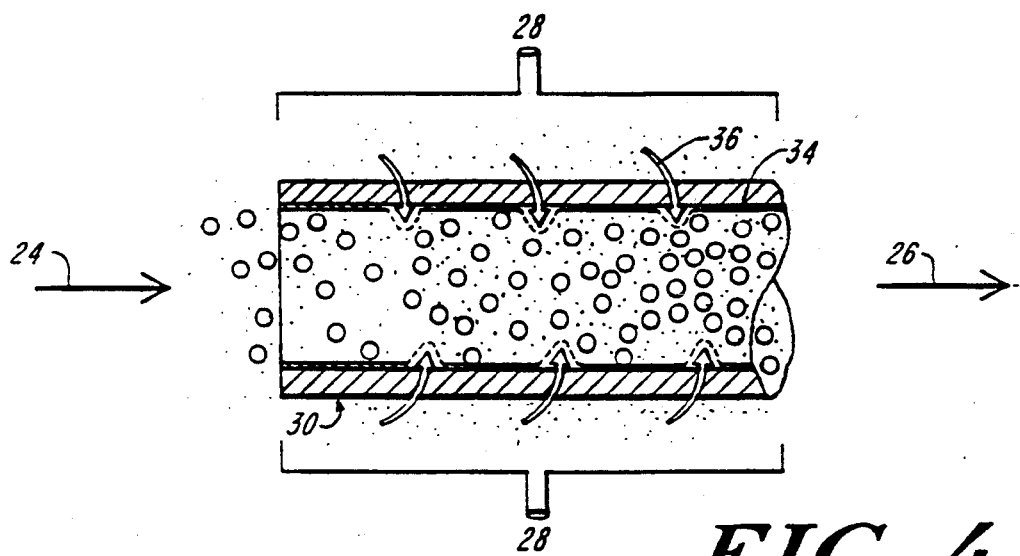
FIG. 4 shows a schematic diagram partially illustrating the process and the apparatus of the invention of FIG. 1.

Tubular membranes provide excellent flow conditions for the separation of solids at relatively low operating pressures and a high recirculation flow rate, as turbulent flow is produced at the membrane surface. Under these conditions, however, a thin layer of solids and/or emulsified oils 34 will be formed on the wall of the membrane 33, in the boundary layer of the fluid, resulting in a fouling of the surface. Referring to FIG. 4, to remove this efficiency-reducing, fouling layer, membrane 30 is subjected to a periodic backpulse or backwash. Referring additionally to FIG. 1, with solenoid 44 closed backpulse tank 40 is pressurized via pressurization line 41 and solenoid 42 to a pressure exceeding the inlet pressure to the membrane. The filtrate is then forced at certain intervals (e.g., every 2-5 min. for a duration of a few seconds) through the membrane in the direction of arrows 36, in the opposite direction to the direction of filtration, without interrupting the cross-flow at the membrane surface 33. In this way, most of the fouling layer 34 is separated from the membrane surface and washed away in the process stream. Valve 44 is then opened and the filtration process is continued, with the original efficiency of the separation process restored.

After many cycles through microfiltration membrane 30, the cleaner solution contaminants in concentration tank 20 become more and more concentrated. The accumulated oils and greases eventually overcome the capability of the emulsifiers to retain them in suspension and float to the surface of the tank. Similarly, the accumulated solids gradually overcome the effective power of the dispersing agents in the cleaner, and solid particles precipitate to the bottom of the tank. Periodically, collected floating oils and greases are removed from the surface of the tank with oil skimmer 46 and associated discharge line and outlet, and precipitated solids are removed from the bottom of the concentration tank via outlet port 48.

Figure 5:
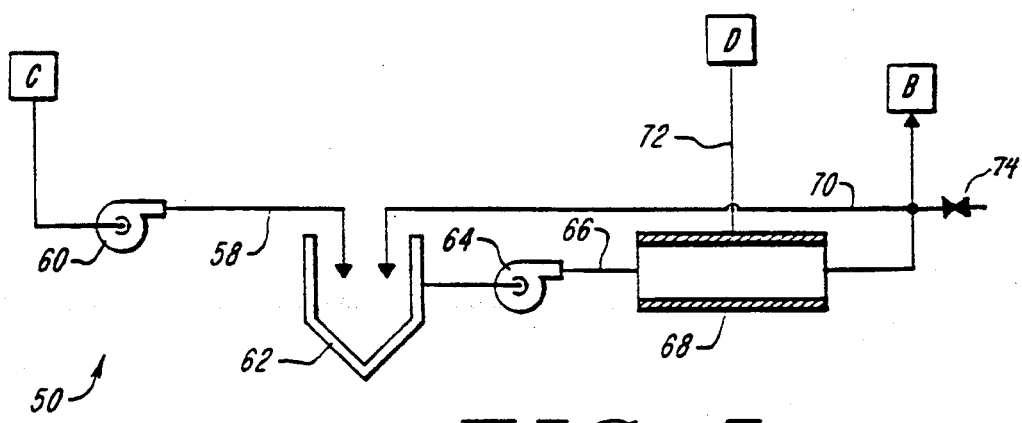
FIG. 5 shows a schematic diagram illustrating the steps of another process of the invention and the relationship of the elements of another apparatus of the invention.
Figure 6:
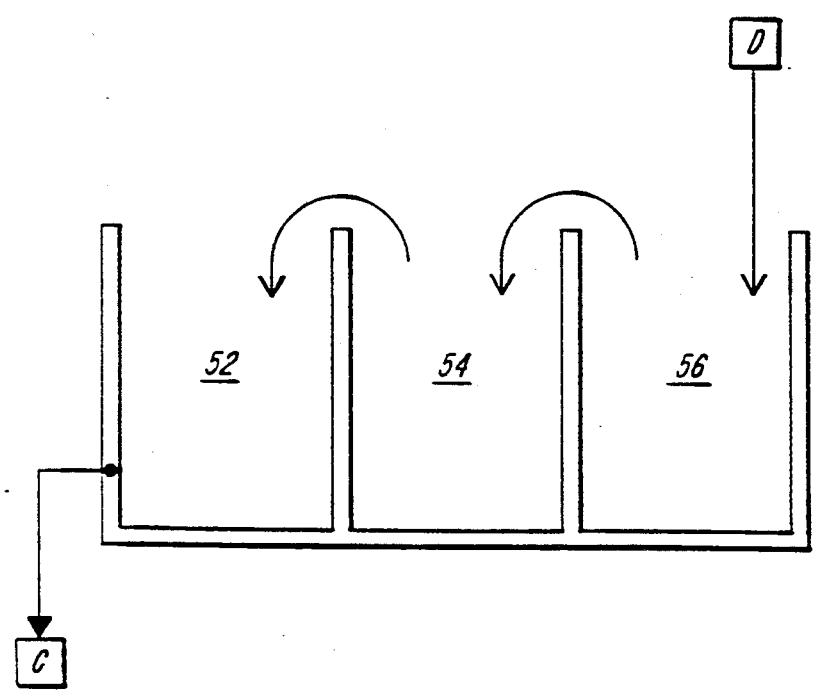
FIG. 6 shows a schematic diagram partially illustrating the process and the apparatus of the invention of FIG. 5.

Referring to FIGS. 5 and 6, rinse water used to rinse machined parts cleaned with recycled aqueous cleaner solution is itself cleaned using rinse filtration system 50. Rinse tank 52 (FIG. 6), the first tank used to rinse an object cleaned with cleaner recycled through microfiltration system 25, is connected for overflow communication with additional rinse tanks 54, 56, into which the object being rinsed is successively dipped. Rinse tank 52 is fitted at point C with a feed system, having feed line 58 and pump 60, to transfer contaminated rinse water, at 5 gal./min. to a 35 gal. capacity conical concentration tank 62, similar in construction to cleaner concentration tank 20. Concentration tank 62 is fitted with a process pump 64 and associated feed line 66 to direct contaminated rinse water from the tank to ultrafiltration membrane 68, having an average pore diameter of 0.002 μm and exclusion size of 30,000 MW. Ultrafiltration membrane 68 is operated in a cross-flow manner, similar to microfiltration membrane 30. Concentrated contaminated rinse water emerging from membrane 68, via feed line 70, is returned to concentration tank 62. Filtered rinse water emerging via process line 72 may be recycled directly to rinse tank 56 at point D; overflow from rinse tank 56 back to tanks 54,52, in the direction of the arrows, recycles the clean rinse water through the rinse process. Alternatively, filtered rinse water emerging from the cleaning system at point D might be given additional treatment with activated carbon, ozone, ion exchange resin or vacuum distillation, individually or in combination, as described. Periodically, the unfiltered process stream in feed line 70 is sampled at valve 74. As this exit stream becomes sufficiently concentrated in aqueous cleaner, the reclaimed cleaner is recovered, supplemented with additives if required and returned to wash tank 10 at point B (see FIG. 2).

Removal of the collected contaminants from microfiltration system concentration tank 20 can occur more easily when the concentration tank is in a static condition, i.e., when the feed pump 22 is not operating. For tanks with less than 1000 gal. capacity, treatment of the cleaner at a rate of 1-4 gal./min. removes the majority of the contaminants and may increase the operational life of the cleaner more than 10 times the life expectancy if the cleaner is not treated. For example, for a tank of 900 gal. supplied by a continuously operating wash system, treatment at 3 gal./min. for 8 hrs/day increased the life of the cleaner from two weeks to greater than 16 weeks. Dumps of hazardous materials are then reduced to a simple removal of oils and solids.

With selection of the proper membrane, the recycling process can operate at the temperature of the cleaning system without a need for heat exchangers and reclaim units. A turnover rate of once per day is usually sufficient to maintain the cleaner in the wash tank in a fresh condition. As a result, membrane filtration systems may be portable to allow for treatment of multiple wash tanks. However, a given filtration system should be used for only one cleaner or type of components being cleaned, or cross-contamination will cause quality problems in the product being cleaned.

A recycling process coupled with backpulsing permits microfiltration membranes to be operated for indefinite periods of time without a physical cleaning of the membranes themselves. Cleaning of the membrane surfaces, to remove buildup of organics, oils and particles on the membrane walls, typically will be accomplished by the cleaner itself. It may be necessary, however, to shut down the system periodically and use an oxidation treatment such as peroxide, either on line or off line, to destroy organic foulants.

The composition of the cleaner will change as surfactants and dispersants are removed along with contaminants; therefore, adjustments need to be made periodically to restore the cleaner to its original strength. As cleaner effectiveness is more dependent upon the buildup of the contaminants than the concentration of the cleaner, the actual concentration of the cleaner in solution in the wash tank may be reduced, while maintaining high quality standards in the cleaning operation, if the cleaner solution is recycled.

Other embodiments of the invention will be apparent to those skilled in the art from a consideration of this specification or practice of the invention disclosed herein. It is intended that the specification and the examples be considered as exemplary only, with the true scope and spirit of the invention being indicated by the following claims.

What is claimed is:

1. A process for treating fluids used in a process for cleaning an object, the fluids comprising an aqueous cleaner solution in which the object is cleaned and rinse water in which the object is rinsed after being cleaned in said aqueous cleaner solution, whereby said aqueous cleaner solution becomes contaminated with contaminants from the object being cleaned and said rinse water becomes contaminated by drag out from the aqueous cleaner solution, said process comprising the steps of:
   treating an aqueous cleaner solution, which has been used in a wash tank to clean an object, to remove contaminants, comprising filtering contaminated aqueous cleaner solution using a first membrane having an average pore diameter chosen to filter out contaminants while not filtering out molecules of aqueous cleaner solution and directing said filtered aqueous cleaner solution back to the wash tank; and
   in parallel with said step of treating an aqueous cleaner solution, treating contaminated rinse water, which has been used in a rinse tank to rinse said cleaned object, to remove molecules of aqueous cleaner which have been transferred from said wash tank into said rinse tank on said object, comprising filtering said contaminated rinse water using a second membrane having an average pore diameter chosen to filter out molecules of aqueous cleaner solution.

2. The process of claim 1 wherein said step of treating said aqueous cleaner solution further comprises:
   transferring contaminated aqueous cleaner solution from the wash tank to a concentration tank; and
   returning unfiltered cleaner solution to said concentration tank after said filtering step.

3. The process of claim 1 wherein said step of treating said contaminated rinse water further comprises:
   collecting filtered rinse water.

4. The process of claim 3 wherein said second membrane has an average pore diameter of less than 0.1 $\mu$m.

5. The process of claim 3 wherein said second membrane is an ultrafiltration membrane having an average pore diameter of 0.001–0.1 $\mu$m.

6. The process of claim 3 wherein said second membrane is a reverse osmosis membrane having an overage pore diameter of less than 0.001 $\mu$m.

7. The process of claim 3 further comprising returning said filtered rinse water to said rinse tank.

8. The process of claim 3 further comprising disposing of said filtered rinse water.

9. The process of claim 3 comprising, following said filtering and collecting steps, further treating said filtered rinse water to remove material creating either a biological oxygen demand or a chemical oxygen demand.

10. A process for treating fluids used in a process for cleaning an object, the fluids comprising an aqueous cleaner solution in which the object is cleaned and rinse water in which the object is rinsed after being cleaned in said aqueous cleaner solution, whereby said aqueous cleaner solution becomes contaminated with contaminants from the object being cleaned and said rinse water becomes contaminated by drag out from the aqueous cleaner solution, said process comprising the steps of:
   treating an aqueous cleaner solution, which has been used in a wash tank to clean an object, to remove contaminants, comprising filtering contaminated aqueous cleaner solution using a first membrane having an average pore diameter chosen to filter out contaminants while not filtering out molecules of aqueous cleaner solution and directing said filtered aqueous cleaner solution back to the wash tank; and
   in parallel with said step of treating an aqueous cleaner solution, treating contaminated rinse water, which has been used in a rinse tank to rinse a cleaned said object, to remove molecules of aqueous cleaner, comprising:
      filtering said contaminated rinse water using a second membrane having an average pore diameter chosen to filter out molecules of aqueous cleaner solution,
      collecting filtered rinse water, and
      collecting aqueous cleaner filtered from said rinse water and returning said collected cleaner to said wash tank.

11. Apparatus for separating an aqueous cleaner solution from emulsified oil and dispersed solid contaminants, said apparatus comprising:
   a wash tank containing an aqueous cleaner solution;
   a concentration tank for containing a contaminated aqueous cleaner solution transferred from a wash tank;
   piping connected to said concentration tank for transferring said contaminated cleaner solution from said wash tank to said concentration tank;
   a membrane having an average pore diameter chosen to filter out contaminants while not filtering out molecules of aqueous cleaner;
   piping connecting said concentration tank with an inlet to said membrane, for transferring said contaminated cleaner solution from said concentration tank to said membrane;
   a pump connected to said piping connecting said concentration tank with said inlet to said membrane, for providing pressurization of said membrane;

piping connected to a first outlet from said membrane, for collecting unfiltered cleaner solution and for returning said unfiltered cleaner solution to said concentration tank; and piping connected to a second outlet from said membrane, for collecting filtered cleaner solution.

12. The apparatus of claim 11 wherein said membrane has an average pore diameter of 0.1–0.4 μm.

13. The apparatus of claim 11 further comprising a backpulse system attached to said membrane.

14. The apparatus of claim 11 further comprising an oil removal system attached to said concentration tank for removing floating oil from the top of said concentration tank.

15. The apparatus of claim 11 further comprising an outlet in said concentration tank for use in removing precipitated solids from said concentration tank.

16. A system for treating fluids used in a process for cleaning an object, the fluids comprising an aqueous cleaner solution in which the object is cleaned, and rinse water, in which the object is rinsed after being cleaned in said aqueous cleaner solution, whereby said aqueous cleaner solution becomes contaminated with contaminants from the object being cleaned and said rinse water becomes contaminated by drag out from the aqueous cleaner solution, comprising:

a wash tank for cleaning an object with aqueous cleaner solution treated to remove contaminants;

apparatus for treating said aqueous cleaner solution to remove contaminants;

piping connecting said wash tank and said aqueous cleaner solution treating apparatus for transferring contaminated aqueous cleaner solution to said aqueous cleaner solution treating apparatus;

a rinse tank for containing water for rinsing an object cleaned with said treated cleaner solution, said rinse tank being adjacent to said wash tank, whereby the cleaned object may be transferred to said rinse tank to be rinsed;

a concentration tank for containing rinse water contaminated with said treated aqueous cleaner solution, said concentration tank being adjacent to said rinse tank;

piping connecting said rinse tank and said concentration tank, for transferring contaminated rinse water to said concentration tank;

a membrane having an average pore diameter chosen to filter out molecules of aqueous cleaner solution;

piping connecting said concentration tank with an inlet to said membrane, for transferring said contaminated rinse water from said concentration tank to said membrane;

a pump connected to said piping connecting said concentration tank and said inlet to said membrane, for providing pressurization of said membrane;

piping connected to a first outlet from said membrane, for collecting unfiltered contaminated rinse water having molecules of aqueous cleaner solution and for returning said unfiltered contaminated rinse water to said concentration tank; and piping connected to a second outlet from said membrane for collecting filtered rinse water.

17. The system of claim 16 wherein said membrane has an average pore diameter of less than 0.1 μm.

18. The system of claim 16 wherein said membrane is an ultrafiltration membrane having an average pore diameter of 0.001–0.1 μm.

19. The system of claim 16 wherein said membrane is a reverse osmosis membrane having an average pore diameter of less than 0.001 μm.

20. The system of claim 16 further comprising activated charcoal filtration apparatus connected to said piping connected to said second outlet.

21. The system of claim 16 further comprising vacuum distillation apparatus connected to said piping connected to said second outlet.

22. The system of claim 16 further comprising ozone treatment apparatus connected to said piping connected to said second outlet.

23. A system for treating aqueous cleaner solution used in a cleaning process to clean an object and for cleaning rinse water used in said cleaning process to rinse an object comprising:

a wash tank for cleaning an object with aqueous cleaner solution;

an apparatus for treating aqueous cleaner solution used in said wash tank, to remove contaminants, said apparatus comprising:

a first concentration tank for containing a contaminated aqueous cleaner solution;

piping connecting said wash tank to said first concentration tank for transferring said contaminated cleaner solution to said first concentration tank;

a membrane having an average pore diameter of 0.1–0.4 μm;

piping connecting said first concentration tank with an inlet to said membrane;

a pump connected to said piping connecting said first concentration tank with said inlet to said membrane, for providing pressurization to said membrane;

a backpulse system connected to said membrane;

piping connected to a first outlet from said membrane, for collecting unfiltered cleaner solution and for returning said unfiltered cleaner solution to said first concentration tank; and piping connected to a second outlet from said membrane, for collecting filtered cleaner solution;

a rinse tank for containing water for rinsing an object cleaned with said treated cleaner solution, said rinse tank being adjacent to said wash tank, whereby the cleaned object may be transferred to said rinse tank to be rinsed; and apparatus for cleaning rinse water used in said rinse tank, said apparatus comprising:

a second concentration tank for containing rinse water contaminated with said treated aqueous cleaner solution, said second concentration tank is connected to said rinse tank;

piping connecting said rinse tank and said second concentration tank, for transferring contaminated rinse water to said second concentration tank;

a membrane having an average pore diameter of less than 0.1 μm;

piping connecting said second concentration tank with an inlet to said second membrane;

a pump connected to said piping connecting said second concentration tank sand said inlet to said second membrane, for providing pressurization of said second membrane;

piping connected to a first outlet from said second membrane, for collecting unfiltered contaminated rinse water and for returning said unfiltered contaminated rinse water to said second concentration tank; and piping connected to a second outlet from said second membrane for collecting filtered rinse water.

24. A process for treating rinse water used for rinsing an object, and contaminated with an aqueous cleaner solution that has been treated to remove contaminants, said process comprising:

treating said contaminated rinse water to remove molecules of aqueous cleaner solution, said rinse water treating step is in parallel with the treatment of the aqueous cleaner solution to remove contaminants, said rinse water treating step comprising filtering said contaminated rinse water using a membrane having an average pore diameter chosen to filter out molecules of aqueous cleaner, and collecting the filtered rinse water.

25. The process of claim 24 wherein said membrane has an average pore diameter of less than 0.1 $\mu$m.

26. The process of claim 24 wherein said membrane is an ultrafiltration membrane having an average pore diameter of 0.001–0.1 $\mu$m.

27. The process of claim 24 wherein said membrane is a reverse osmosis membrane having an average pore diameter of less than 0.001 $\mu$m.

28. The process of claim 24 further comprising collecting aqueous cleaner solution filtered from said rinse water and returning said collected cleaner for further cleaning of an object.

29. The process of claim 24 further comprising returning said filtered rinse water to said rinse tank.

30. The process of claim 24 further comprising disposing of said filtered rinse water.

31. The process of claim 24 further comprising, following said filtering and collecting steps, further treating said filtered rinse water to remove material creating either a biological oxygen demand or a chemical oxygen demand.

* * * * *